(12) United States Patent
Greco et al.

(10) Patent No.: US 7,181,569 B2
(45) Date of Patent: Feb. 20, 2007

(54) METHOD, SYSTEM, AND ARTICLE OF MANUFACTURE FOR WRITING ON SEQUENTIAL STORAGE MEDIA

(75) Inventors: Paul Merrill Greco, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/375,726

(22) Filed: Feb. 26, 2003

(65) Prior Publication Data

US 2004/0168023 A1    Aug. 26, 2004

(51) Int. Cl.
*G06F 12/00* (2006.01)

(52) U.S. Cl. .......................................... 711/111; 711/4
(58) Field of Classification Search ................ 711/4, 711/111, 112, 202; 360/48, 57, 60, 90
See application file for complete search history.

(56) References Cited

U.S. PATENT DOCUMENTS

| | | | |
|---|---|---|---|
| 5,491,807 A * | 2/1996 | Freeman et al. ................ 711/1 |
| 5,913,215 A * | 6/1999 | Rubinstein et al. ........... 707/10 |
| 6,014,675 A * | 1/2000 | Brewer et al. .............. 707/204 |
| 6,101,059 A * | 8/2000 | Wong et al. .................. 360/70 |
| 6,288,862 B1 | 9/2001 | Baron et al. |
| 6,339,810 B1 | 1/2002 | Basham et al. |
| 6,779,080 B2 * | 8/2004 | Basham et al. ............. 711/112 |
| 2002/0024756 A1 | 2/2002 | Baron et al. |
| 2002/0035665 A1 | 3/2002 | Basham et al. |

* cited by examiner

*Primary Examiner*—Brian R. Peugh
*Assistant Examiner*—Matthew Bradley
(74) *Attorney, Agent, or Firm*—Rabindranath Dutta; Konrad Raynes & Victor LLP

(57) ABSTRACT

Provided are a method, system and article of manufacture for writing on a storage media. Data is received from a host. A determination is made whether the received data can potentially form a trailer record on the storage media. If the received data does not potentially form the trailer record, then the received data is written to the storage media.

22 Claims, 7 Drawing Sheets

METHOD, SYSTEM, AND ARTICLE OF MANUFACTURE FOR WRITING ON SEQUENTIAL STORAGE MEDIA

BACKGROUND OF THE INVENTION

1. Field of the Invention

The present invention relates to a method, system, and an article of manufacture for writing on sequential storage media.

2. Description of the Related Art

A host computer system may write host data onto a storage medium located on a storage device. If the storage medium is a tape, then a tape drive may append a trailer record at the end of the host data on the tape. The trailer record represents the end of host data on the tape. On successive appends of host data to the tape, the tape drive overwrites the existing trailer record and appends a new trailer record at the end of the appended host data.

Storage media that exhibit write-once/read-many (WORM) behavior can be written to only once but can be read a plurality of times. Data on WORM storage media is not subject to alteration and therefore is stored more reliably when compared to data stored in non-WORM storage media. WORM storage media may be useful for many applications, such as, logs and journals. Optical disks are a commonly used WORM media. Optical disks achieve WORM behavior because the writing process on optical disks is permanent in nature, i.e., once data is physically written on an optical disk the data cannot be erased.

Notwithstanding the use of WORM storage media and the use of trailer records for writing on storage media there is a need in the art for improved techniques for writing on storage media.

SUMMARY OF THE PREFERRED EMBODIMENTS

Provided are a method, system and article of manufacture for writing on a storage media. Data is received from a host. A determination is made whether the received data can potentially form a trailer record on the storage media. If the received data does not potentially form the trailer record, then the received data is written to the storage media.

In additional implementations, the storage media is located in a storage device, and the receiving, determining and writing are performed by the storage device. In further implementations, the received data is stored in an alternate area if the received data can potentially form the trailer record.

In further implementations, the storage media and the alternate area are transported and maintained within a single physical unit, wherein the alternate area is coupled to a tape cartridge, and wherein the tape cartridge includes the storage media.

In additional implementations, the storage media is a serpentine tape, wherein the writing is on one wrap of the serpentine tape, and wherein the storing is on another wrap of the serpentine tape. In further implementations, the storage media is a helical or non-serpentine tape.

In additional implementations, an alternate area exists within a same media space as the storage area, and the received data is stored in the alternate area if the received data can potentially form the trailer record. In further implementations, trailer data written in the alternate area is logically invalidated by host data following the trailer data, and the trailer data is not overwritten.

The implementations of the invention allow write-once/read-many type of behavior on storage media.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
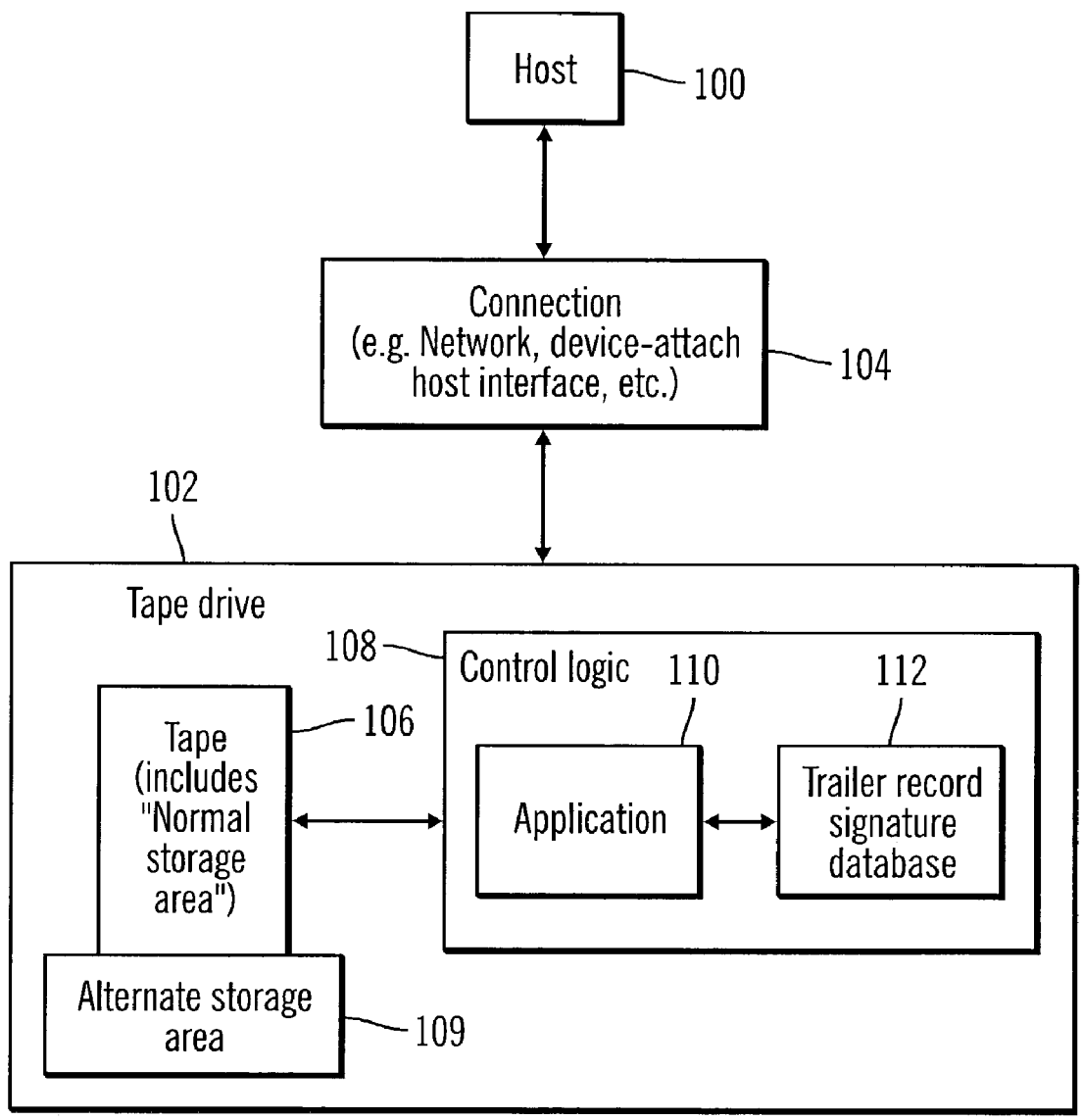
FIG. 1 illustrates a block diagram of a computing environment, in accordance with certain described implementations of the invention.

FIG. 1 illustrates a block diagram of a computing environment, in accordance with certain implementations of the invention. A host 100 is coupled to a tape drive 102 via a connection 104. The host 100 may be any computational device known in the art, such as a personal computer, a workstation, a server, a mainframe, a hand held computer, a palm top computer, a telephony device, a network appliance, etc. The host 100 may include any operating system known in the art, such as the IBM OS/390 operating system. The connection 104 may include any network known in the art, such as the Internet, an intranet, a Local area network (LAN), a Storage area network (SAN), a Wide area network (WAN), a wireless network, etc. The network may be part of one or more larger networks or may be an independent network or may be comprised of multiple interconnected networks. In certain implementations, the connection 104 may include any device-attach host interfaces known in the art, such as SCSI, Fibre channel, ESCON, FICON, etc. In alternative implementations, other device-attach host interfaces may be used. The host 100 may alternatively be connected to the tape drive 102 by the connection 104 through direct lines, common bus systems, etc., in a manner known in the art. Various intermediate computational devices such as a virtual tape server (not shown) may transfer data between the host 100 and the tape drive 102. While only a single host 100 and a single tape drive 102** is shown, in alternative implementations a plurality of hosts may be coupled to a plurality of tape drives. Furthermore, alternative implementations may use other storage devices known in the art that are different from the tape drive 102.

IBM, OS/390, MSV, ESCON, FICON are trademarks of International Business Machine Corp. UNIX is a trademark of "The Open Group"

The tape drive 102 comprises a tape 106, a control logic 108, and an alternate storage area 109 coupled to the tape 106. The tape 106 may be any type of tape known in the art, such as a serpentine tape located in a linear tape open (LTO) drive and includes the normal storage area for data. The control logic 108 can perform input/output (I/O) to the tape 106, i.e., the control logic 108 can read from the tape 106 and write to the tape 106. The control logic 108 may be implemented in software, hardware, or firmware on the tape drive 102. In alternative implementations of the invention some or all of the functions of the control logic 108 may be implemented in the host 100. In certain implementations, the alternate storage area 109 may be physically separate (i.e., a disparate mechanism) from the normal storage area included in the tape 106. For example, the alternate storage area 109 may be a non-volatile cartridge memory. In other implementations, the alternate storage area 109 is not physically separate from the tape 106 but may be a logically or physically different storage area from the normal storage area included within the tape 106. For example, the alternate storage area 109 may be on a different wrap or a longitudinally/laterally different portion than the normal storage area of tape 106. The alternate storage area may also be logically differentiated via formatting control or status constructs.

The control logic 108 comprises an application 110 and a trailer record signature database 112. The application 110 interprets commands received from the host 100 and accesses entries located within the trailer record signature database 112 prior to writing on the tape 106. The application 110 is capable of accessing the tape 106 by logical records or file markers associated with the tape 106. The trailer record signature database 112 contains commonly used trailer records that indicate end of data on well-known tape formats. The writing of data on the tape 106 is such that the tape 106 exhibits a WORM behavior.

Figure 2:
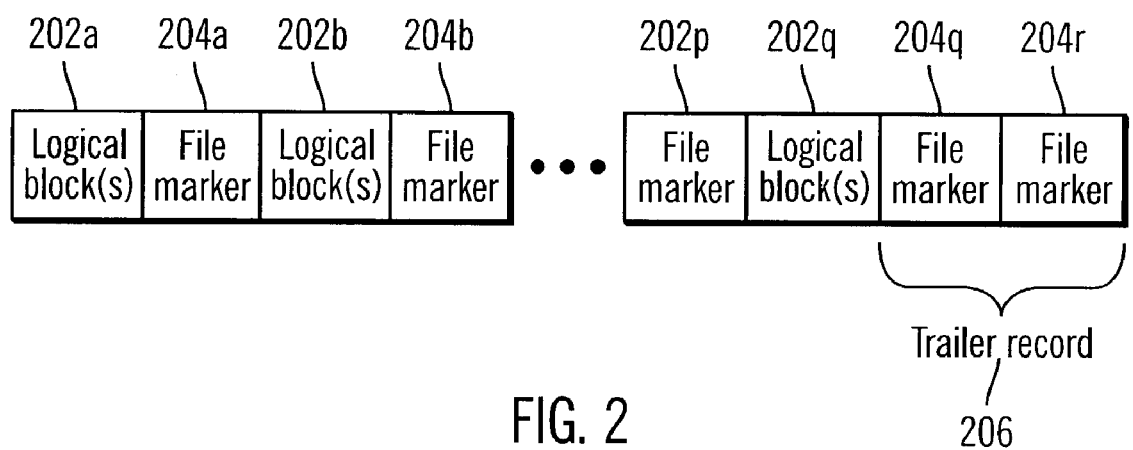
FIG. 2 illustrates a block diagram of a first logical representation of a tape, in accordance with certain described implementations of the invention.

FIG. 2 illustrates a block diagram of a first logical representation of the tape 106, in accordance with certain implementations of the invention. The application 110 interprets data on the tape 106 to the host 100 as a sequence of logical blocks 202a ... 202q and file markers 204a ... 204p followed by two successive file markers 204q and 204r that comprise a trailer record 206.

As a result of interpretation by the application 110, data on the tape 106 may logically appear to the host 100 as the logical blocks 202a ... 202q separated by the file markers 204a ... 204p and followed by the two consecutive file markers 204q, 204r that comprise the trailer record 206. The trailer record 206 indicates to the host 100 that end of data has been reached on the tape 106. Such trailer records 206 may be found in UNIX** type systems or in open systems. Each of the logical blocks 202a ... 202q may comprise of one or a plurality of logical blocks, where a logical block is an arbitrary sized record of information and a number of logical blocks followed by a file marker may logically represent a file to the host 100. For example, the logical blocks 202a followed by the file marker 204a may logically represent a file to the host 100. The file markers 204a, 204b, ... 204p are separation indicators that separate successive groups of logical blocks 202a ... 202q.

IBM, OS/390, MSV, ESCON, FICON are trademarks of International Business Machine Corp. UNIX is a trademark of "The Open Group"

Physically, data on the tape 106 includes the logical blocks 202a ... 202q and the file markers 204a ... 204p. In implementations of the invention, the tape 106 may not physically include the trailer record 206. The format of the trailer record 206 as represented by the two successive file markers 204q, 204r is found as an entry in the trailer record signature database 112 and is recorded in the alternate storage area 109.

Figure 3:
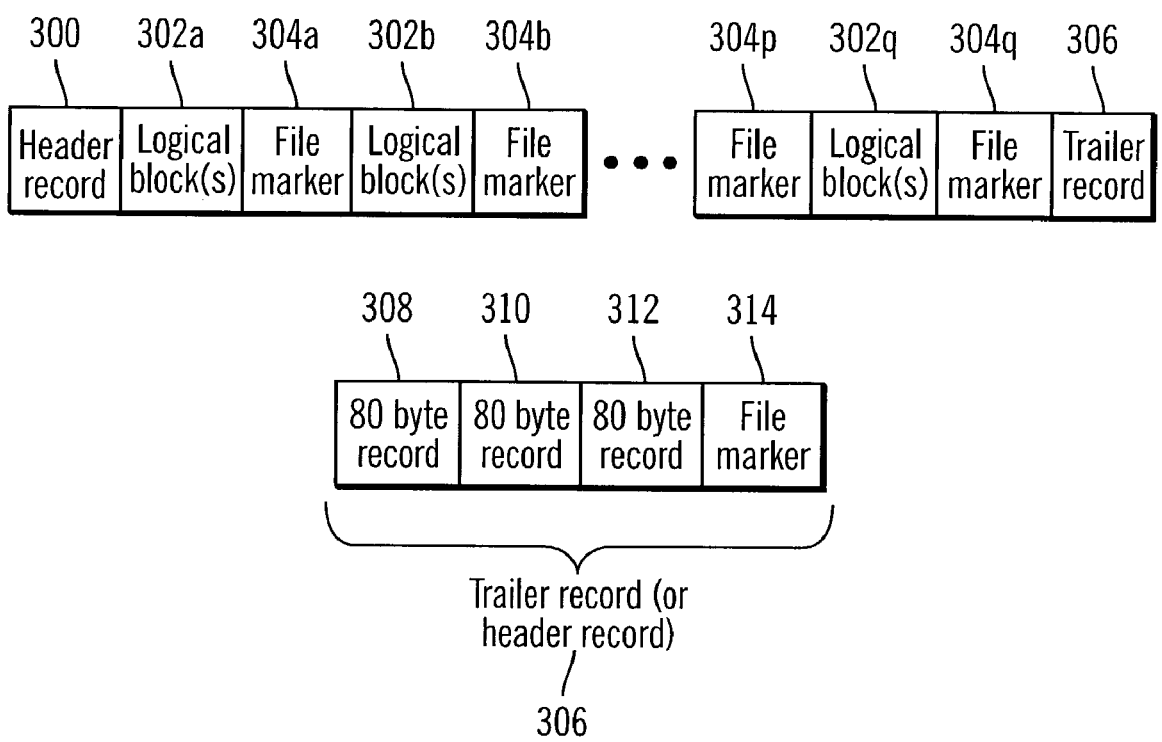
FIG. 3 illustrates block diagrams of a second logical representation of a tape, in accordance with certain described implementations of the invention.

FIG. 3 illustrates block diagrams of a second logical representation of the tape 106, in accordance with certain implementations of the invention. The application 110 logically interprets data on the tape 106 to the host 100 as a header record 300, followed by a sequence of logical blocks 302a ... 302q and file markers 304a ... 304q, followed by a trailer record 306. The header record 300 and the trailer record 306 may comprise of three 80 byte logical blocks 308, 310, 312 followed by a file marker 314. Such header records 300 and trailer records 306 may be found in MVS** systems.

IBM, OS/390, MSV, ESCON, FICON are trademarks of International Business Machine Corp. UNIX is a trademark of "The Open Group"

Physically, in the second logical representation of the tape 106, data on the tape 106 includes the header record 300, the logical blocks 302a ... 302q and the file markers 304a ... 304q. In implementations of the invention, the tape 106 may not physically include the trailer record 306. The format of the trailer record 306 is found as an entry in the trailer record signature database 112 and is recorded in the alternate storage area 109.

The first and second logical representations of the tape 106 are representative in nature and implementations of the invention may have other logical representations of the tape 106. For example, the trailer records 206 and 306 may have other representations than those described in FIGS. 2 and 3. Such alternative representations of the trailer records 206, 306 are also found as an entry in the trailer record signature database 112 and are recorded in the alternate storage area 109.

Figure 4:
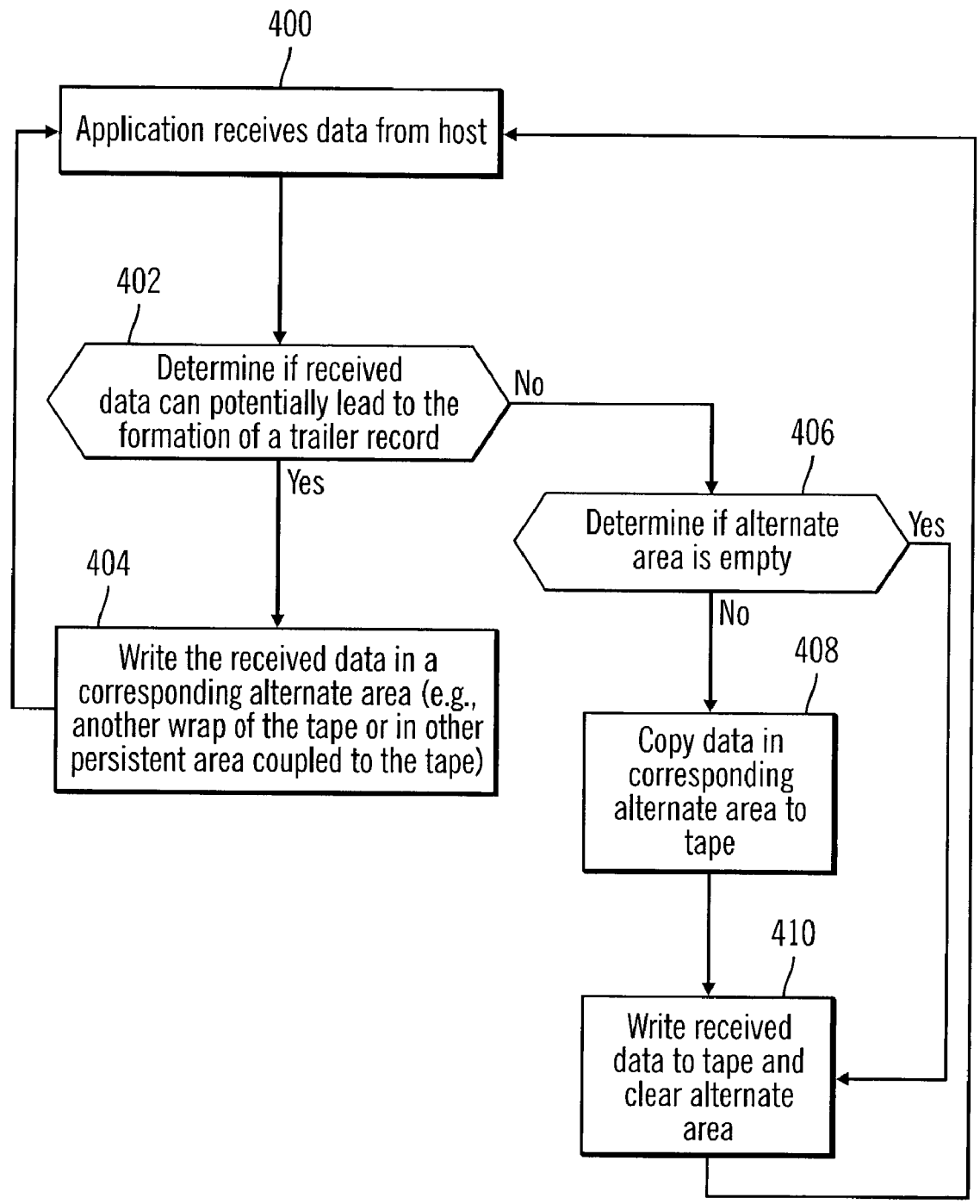
FIG. 4 illustrates logic for writing on a tape that exhibits WORM behavior, in accordance with certain described implementations of the invention.

FIG. 4 illustrates logic for writing on the tape 106 that exhibits WORM behavior, in accordance with certain implementations of the invention. The logic of FIG. 4 is implemented by the application 110 located in the tape drive 102.

Control starts at block 400 where the application 110 receives a write request and corresponding data from the host 100. The data accompanying the write request from the host 100 may be a part of a logical block (such as part of logical blocks 202a or 302a), a file marker (such as file marker 204a, 304a), part of a header record (such as part of header record 300), or part of a trailer record (such as part of trailer record 206, 306). It should be noted that the header records do not need to be specially recorded except as candidates for trailer records in the database 112, if the header records resemble the structure of a known trailer record. The header records are not overwritable in a WORM environment.

Control proceeds to block 402, where the application 110 determines if the received host data potentially lead to the formation of a trailer record in combination with any data previously received or any data that can be potentially received in the future. For example, if the application 110 receives the 80 byte record 310 immediately after receiving the 80 byte record 308 then the received 80 byte record 310 may lead to the formation of a trailer record. In the case of open systems where two consecutive file markers form a trailer record, when the application 110 receives a file marker, the file marker may potentially lead to the trailer record 206. To determine if the received host data may potentially lead to the formation of a trailer record, the application 110 may access the database 112 where the signature of all potential trailer records are stored. Various schemes known in art such as substring matching, etc., may be used to determine if a string of successively received data may potentially be the beginning part of a trailer record.

If at block 402 the application 110 determines that the received data can potentially lead to the formation of a trailer record control proceeds to block 404. At block 404 the application 110 writes the received data in a corresponding part of the alternate storage area 109 that is different from the area of the tape 106 where host data is stored. For the tape 106 to exhibit WORM behavior, areas of the tape 106 where host data is written can never be overwritten with other data. Therefore, trailer records are never written to the areas of the tape 106 where host data is written. The alternate storage area 109 may be in another wrap of the tape 106 or may be in other persistent storage that is coupled to the physical housing that comprises the tape cartridge corresponding to the tape 106. To elaborate, tape 106 represents a data area that is distinct from the alternate storage area 109, even though in certain implementations the alternate storage area 109 may physically be located on the recording media comprising the tape 106. Control returns to block 400, where the application 110 receives further data from the host 100.

If at block 402 the application 110 determines that the received host data cannot potentially lead to the formation of a trailer record control proceeds to block 406. At block 406 the application 110 determines if the corresponding part of the alternate storage area 109 is empty. If the corresponding part of the alternate storage area is empty, then the received data is not a trailer record and control proceeds to block 410 where the application 110 writes the received data to the area of the tape 106 where host data is stored. After writing the received data the alternate area 109 is cleared. Control returns to block 400.

If at block 406 the application 110 determines that the corresponding part of the alternate storage area 109 is not empty, then the data already written in the corresponding part of the alternate storage area 109 when appended with the received data is not a trailer record. Therefore, at block 408 the data already written in the corresponding part of the alternate storage area 109 is copied to the tape 106. Control proceeds to block 410 where the received data is written to the tape 106. Control returns to block 400.

The logic described in FIG. 4 stores host data without the trailer record in a specific area of the tape 106 where no overwriting is allowed. The trailer record is stored in an alternate storage area 109 coupled to the tape.

Figure 5:
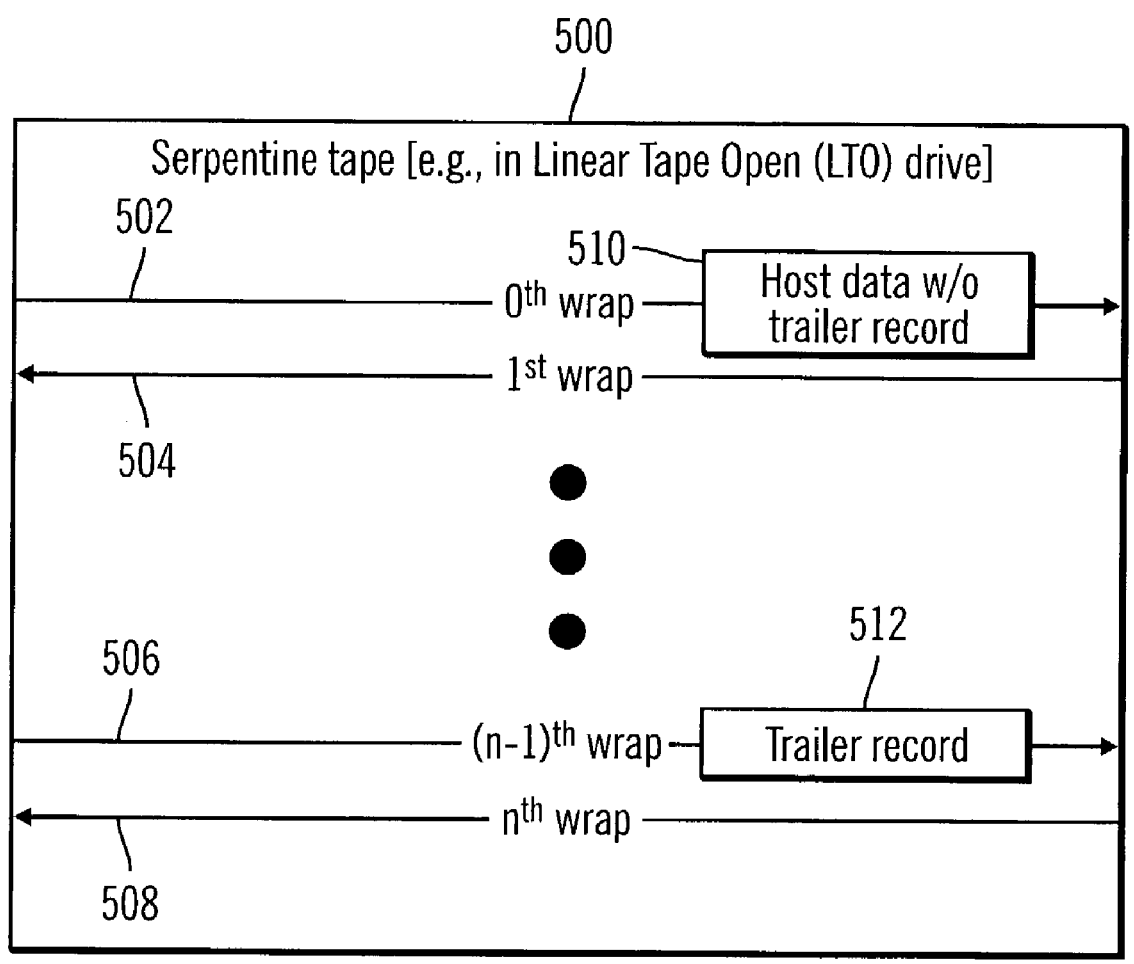
FIG. 5 illustrates a block diagram of a serpentine tape that exhibits WORM behavior, in accordance with certain described implementations of the invention.

FIG. 5 illustrates a block diagram of a logical representation of the tape 106, where the tape 106 is logically represented as a serpentine tape 500 that exhibits WORM behavior, in accordance with certain implementations of the invention. The logic of FIG. 4 may cause the serpentine tape 500 to exhibit WORM behavior.

In the serpentine tape 500 there are a plurality of wraps (wraps 0 . . . n that are represented by reference numerals 502, 504, 506, 508) where information may be written in a manner known in the art. In certain implementations, the application 110 may write host data without the trailer record 510 to the $0^{th}$ wrap 502 and the trailer record 512 to the $(n-1)^{th}$ wrap 506. Data on the $0^{th}$ wrap 502 is never overwritten, whereas data on the $(n-1)^{th}$ wrap 506 may be overwritten.

The serpentine tape 500 thus uses the $(n-1)^{th}$ wrap 506 as the alternate storage area 109 for the $0^{th}$ wrap 502 of the serpentine tape 500 to exhibit WORM behavior. In alternative implementations other tape formats may be used. Similarly instead of using another wrap of the tape 106 as the alternate storage area 109, the alternate storage area 109 may be any persistent storage that is not part of the tape 106.

Figure 6:
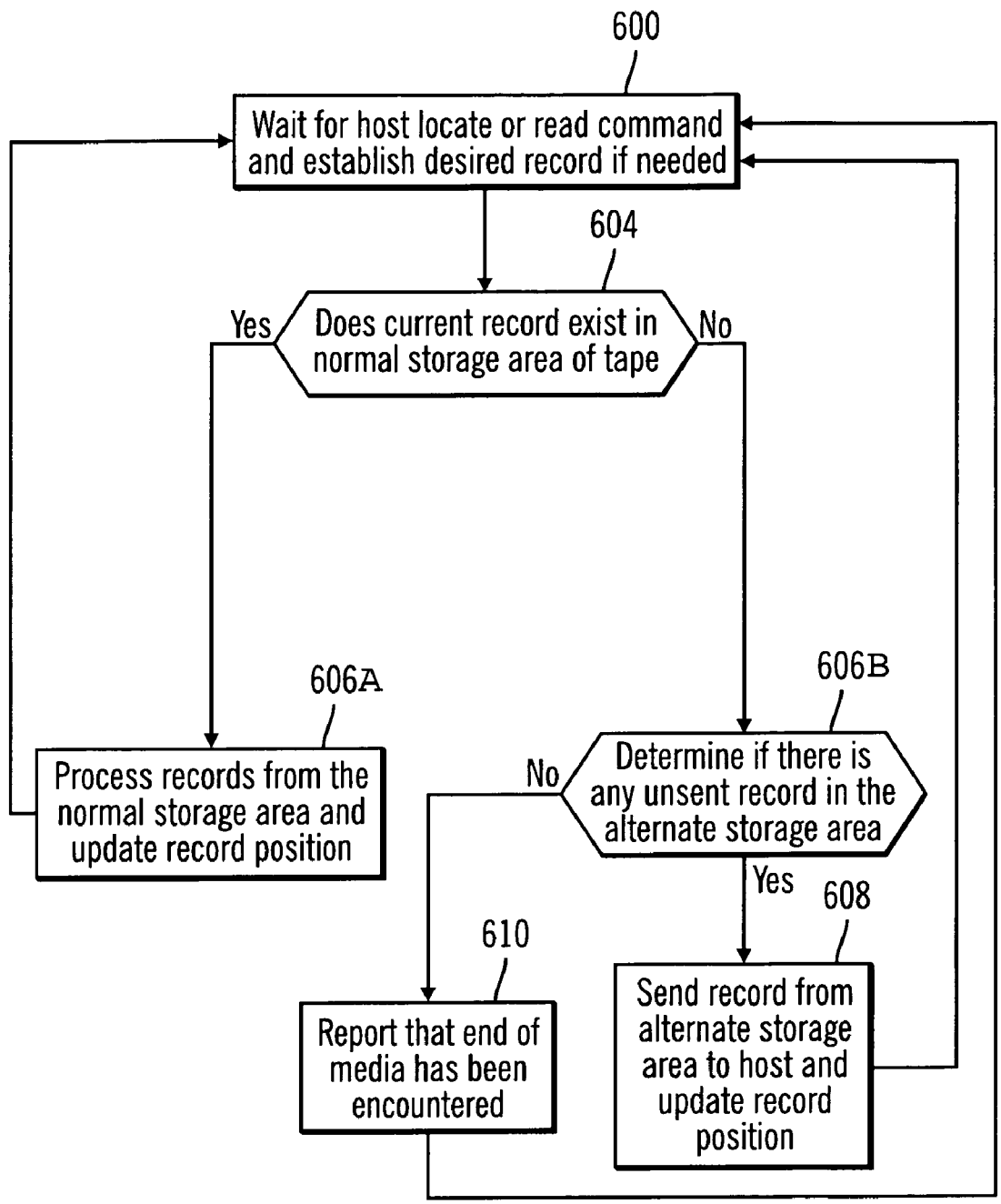
FIG. 6 illustrates logic for reading from a tape that exhibits WORM behavior, in accordance with certain described implementations of the invention.

FIG. 6 illustrates logic for reading from the tape 106 that exhibits WORM behavior, in accordance with certain implementations of the invention. The logic of FIG. 6 is performed by the application 110.

Control starts at block 600 where the application 110 waits for a locate or read request from the host 100 and establishes the desired record corresponding the locate or read request if needed. The information returned by the application 110 to the host 100 in response to the locate or read request should be identical to what the host 100 would receive if the trailer records were not part of the alternate storage area 109. Note that header records can be recorded normally and no special determination is required at read time for the header records.

Control proceeds to block 604 where the application 110 determines if the current record corresponding to the read or locate request exist on the normal storage area of the tape 106. If so, control proceeds to block 606 where the application 110 processes records from the normal storage area of the tape 106, updates the record position, and then returns control back to block 600. Processing the records at block 604 may include returning information to the host 100 in response to the read or locate requests.

If at block 604, the application 110 determines that the current record does not exist in the normal storage area of the tape 106 control proceeds to block 606. At block 606, the application 110 determines if there is any unsent record in the alternate storage area 109. If so, the application 110 sends (at block 608) the unsent records from alternate storage area 109 to the host 100 and updates the record position. Subsequently, the application 110 returns control to block 600.

If at block 606, the application 110 determines that there is no unsent record in the alternate storage area 109 control proceeds to block 610. At block 610, the application 110 reports to the host 100 that end of media has been encountered and returns control to block 600.

The logic of FIG. 6 allows the tape 106 to exhibit WORM behavior by having the application 110 interpret the data on the tape 106 and the alternate area 109 in a manner such that it is not apparent to the host 100 that the trailer records were stored in the alternate area 109.

In the described implementations, the WORM behavior is achieved by having an alternate storage area 109 in a different media space from the normal storage area of the tape 106. Implementations may be adapted for cases where the drive recording format, i.e. the low level logical format, is write-skipping. This allows the alternate storage area 109 to exist within the same media space as the unwritable data (i.e. the normal storage area of the tape 106) but to be logically invalidated by data which follows data written in the alternate storage area 109. In this case, the data including the trailers, is truly never overwritten, but a device format construct causes the older copies to be ignored as part of the read process.

Storage media that exhibit write once read many (WORM) behavior may not have data overwritten on the storage media. Although optical drives may be used for achieving WORM behavior, such optical drives are very slow when compared to tape drives. Implementations of the invention achieve WORM behavior on storage tapes and analogous storage media. The trailer records are not written in the same area as the host data, and therefore the area where host data is written never needs to be overwritten. However, from the perspective of the host the tape still appears to comprise of logical blocks separated by file markers and ending with a trailer record. The implementations of the invention reduce the risk of data loss in storage media. Furthermore, the application that implements WORM behavior is located in the tape drive itself.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 7:
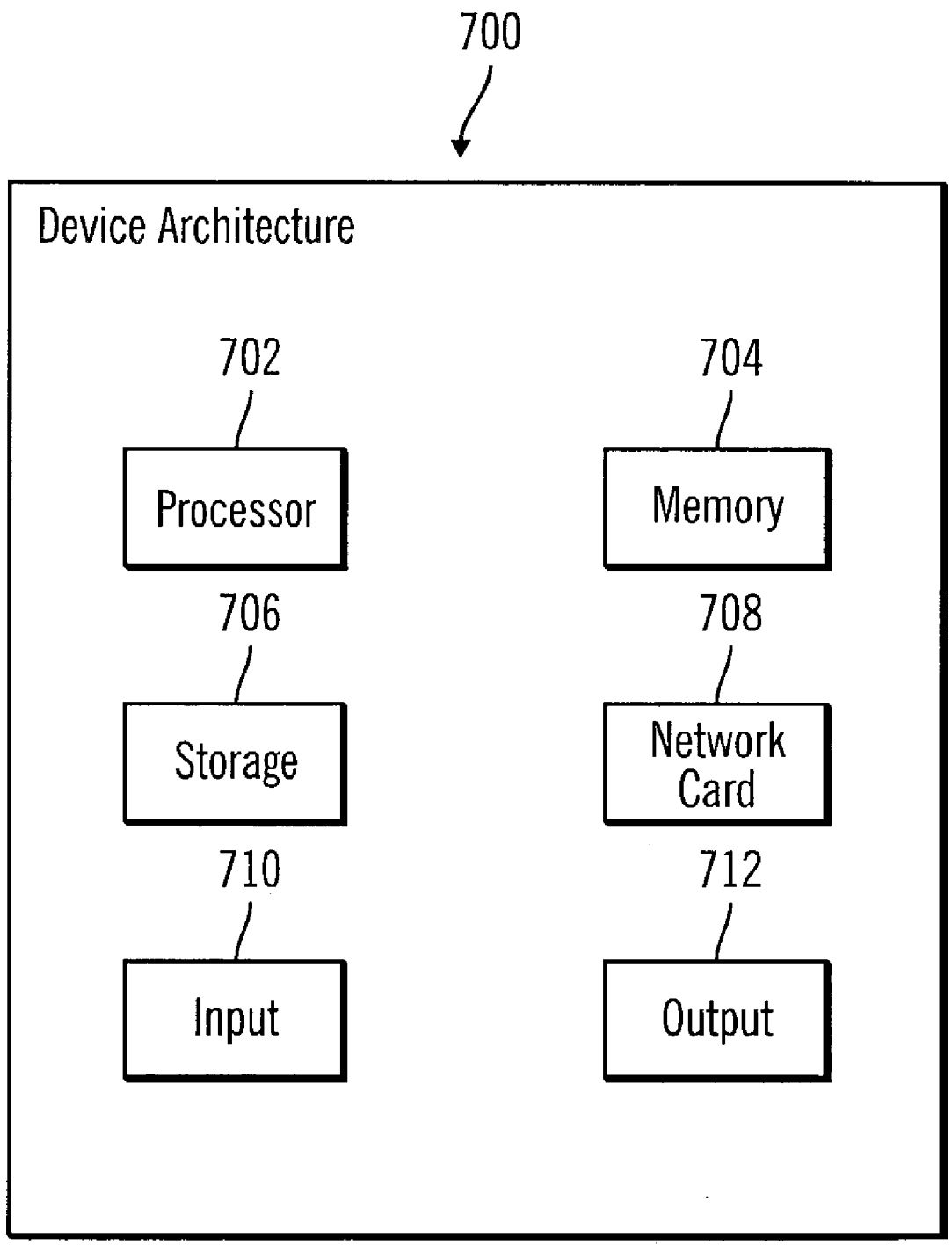
FIG. 7 illustrates a block diagram of a device architecture in which certain described aspects of the invention are implemented.

FIG. 7 illustrates a block diagram of a device architecture in which certain aspects of the invention are implemented. FIG. 7 illustrates elements associated with one implementation of the host 100 and the tape drive 102. The host 100 and the tape drive 102 may implement a device architecture 700 having a processor 702, a memory 704 (e.g., a volatile memory device), and a storage 706 (e.g., non-volatile storage, magnetic disk drives, optical disk drives, tape drives, etc.). The storage 706 may comprise an internal storage device, an attached storage device or a network accessible storage device. Programs in the storage 706 may be loaded into the memory 704 and executed by the processor 702 in a manner known in the art. The architecture may further include a network card 708 to enable communication with a network. The architecture may also include at least one input 710, such as a keyboard, a touchscreen, a pen, voice-activated input, etc., and at least one output 712, such as a display device, a speaker, a printer, etc.

The logic of FIGS. 4 and 6 describe specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes.

In alternative implementations, the application 110 may be in the host 100 rather than in the tape drive 102. Also, while the host 100 and the tape drive 102 communicate within a client-server paradigm in the described implementations, the hosts 102 and the tape drive 102 may also communicate within a peer-to-peer or any other paradigm known in the art. Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures shown in FIGS. 2 and 3 show the data structures as having specific types of information. In alternative implementations, the data structures may have fewer, more or different fields than shown in the figures.

Certain groups of elements shown in the figures have been labeled with reference numerals having an identical numeric prefix followed by the suffix "a", the suffix "b", or the suffix "n". For example, logical blocks are labeled 204a . . . 204q and 304a . . . 304q. Labeling groups of elements in such a manner does not imply that different groups of elements contain an identical number of elements in each group. For example, the number of logical blocks 204a . . . 204q need not be the same as the number of logical blocks 304a . . . 304q.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for writing on a storage media, comprising:
   receiving data from a host;
   determining if the received data leads to a formation of a trailer record; and
   writing the received data to the storage media if the received data does not lead to the formation of the trailer record; and
   writing the received data in an alternate area if the received data leads to the formation of the trailer record, the method further comprising:
   (i) receiving a read request from the host;
   (ii) sending data records from the storage media to the host; and
   (iii) sending the trailer record from the alternate area to the host.

2. The method of claim 1, wherein the storage media and the alternate area are transported and maintained within a single physical unit, wherein the alternate area is coupled to a tape cartridge, and wherein the tape cartridge includes the storage media.

3. The method of claim 1, wherein the alternate area is a persistent storage coupled to the storage media.

4. A method for writing on a storage media, comprising:
   receiving data from a host;
   determining if the received data leads to a formation of a trailer record; and
   writing the received data to the storage media if the received data does not lead to the formation of the trailer record, wherein a control logic is coupled to a database comprising a plurality of known trailer records, and wherein the control logic determines if the received data leads to the formation of the trailer record by comparing the received data with the plurality of known trailer records.

5. The method of claim 4, wherein the storage media is located in a storage device, and wherein the receiving, determining and writing are performed by the storage device.

6. The method of claim 4, wherein the storage media is a serpentine tape, wherein the received data is written on one wrap of the serpentine tape if the received data does not lead to the formation of the trailer record, and wherein the received data is written on another wrap of the serpentine tape if the received data leads to the formation of the trailer record.

7. The method of claim 4, wherein the storage media is a helical or non-serpentine tape.

8. The method of claim 4, wherein the written data on the storage media is never overwritten by additional data by writing the additional data to an area of the storage media that does not include the written data if the additional data is not a trailer record, and by writing the additional data to an area outside the storage media if the additional data is at least one trailer record.

9. The method of claim 4, wherein the trailer record comprises of two successive file markers or comprises of a plurality of predetermined records followed by a file marker.

10. The method of claim 4, wherein the received data is written to one area of the storage media if the received data does not lead to the formation of the trailer record, and wherein an alternate area exists within the storage medium, the method further comprising:
writing the received data in the alternate area if the received data leads to the formation of the trailer record.

11. The method of claim 10, wherein trailer data written in the alternate area is logically invalidated by host data following the trailer data, and wherein the trailer data is not overwritten.

12. A system for writing on a storage media, comprising:
a host;
a storage media coupled to the host;
means for receiving data from the host;
means for determining if the received data leads to a formation of a trailer record;
means for writing the received data to the storage media if the received data does not lead to the formation of the trailer record;
means for writing the received data in an alternate area if the received data leads to the formation of the trailer record;
means for receiving a read request from the host;
means for sending data records from the storage media to the host; and
means for sending the trailer record from the alternate area to the host.

13. The system of claim 12, wherein the storage media and the alternate area are transported and maintained within a single physical unit, wherein the alternate area is coupled to a tape cartridge, and wherein the tape cartridge includes the storage media.

14. The system of claim 12, wherein the alternate area is a persistent storage coupled to a the storage media.

15. A system for writing on a storage media, comprising:
a host;
a storage media coupled to the host;
means for receiving data from the host;
means for determining if the received data leads to a formation of a trailer record; and
means for writing the received data to the storage media if the received data does not lead to the formation of the trailer record, wherein a control logic is coupled to a database comprising a plurality of known trailer records, and wherein the control logic determines if the received data leads to the formation of the trailer record by comparing the received data with the plurality of known trailer records.

16. The system of claim 15, wherein the storage media is located in a storage device, and wherein the receiving, determining and writing are performed by the storage device.

17. The system of claim 15, wherein the storage media is a serpentine tape, wherein the received data is written on one wrap of the serpentine tape if the received data does not lead to the formation of the trailer record, and wherein the received data is written on another wrap of the serpentine tape if the received data leads to the formation of the trailer record.

18. The system of claim 15, wherein the storage media is a helical or non-serpentine tape.

19. The system of claim 15, wherein the written data on the storage media is never overwritten by additional data by writing the additional data to an area of the storage media that does not include the written data if the additional data is not a trailer record, and by writing the additional data to an area outside the storage media if the additional data is at least one trailer record.

20. The system of claim 15, wherein the trailer record comprises of two successive file markers or comprises of a plurality of predetermined records followed by a file marker.

21. The system of claim 15, wherein the received data is written to one area of the storage media if the received data does not lead to the formation of the trailer record, and wherein an alternate area exists within the storage medium, the system further comprising:
means for writing the received data in the alternate area if the received data leads to the formation of the trailer record.

22. The system of claim 21, wherein trailer data written in the alternate area is logically invalidated by host data following the trailer data, and wherein the trailer data is not overwritten.

* * * * *